Nov. 15, 1938. E. R. MARTIN Re. 20,919

STEEL WOOL PAD

Original Filed Dec. 30, 1935

Inventor

Elmer R. Martin

By Owen & Owen

Attorneys

Reissued Nov. 15, 1938 Re. 20,919

UNITED STATES PATENT OFFICE 20,919

STEEL WOOL PAD

Elmer R. Martin, Springfield, Ohio, assignor to The Williams Company, London, Ohio, a corporation of Ohio Original No. 2,123,338, dated July 12, 1938, Serial No. 56,648, December 30, 1935. Application for reissue September 1, 1938, Serial No. 228,002

7 Claims. (Cl. 15—230)

This invention relates to steel wool pads, but particularly to steel wool pads for floor surfacing operations, and an object is to produce a simple and efficient steel wool pad for floor surfacing use which will satisfactorily retain its shape and will operate satisfactorily over an extended period of time.

Another object is to provide a steel wool pad in the form of an annulus, the peripheral edge portion of which is increased in thickness and adequately reinforced so that the strands are properly held in position.

A further object is to produce a steel wool pad adapted to be disposed between the rotating element of a floor surfacing machine and the surface upon which work is to be done so that the pad is rotated by such member, the pad being thickened and reinforced at its peripheral edge portion for accomplishing most efficient results.

Further objects of the invention will hereinafter appear, and an embodiment of the invention is shown in the accompanying drawing, in which.

Figure 1:
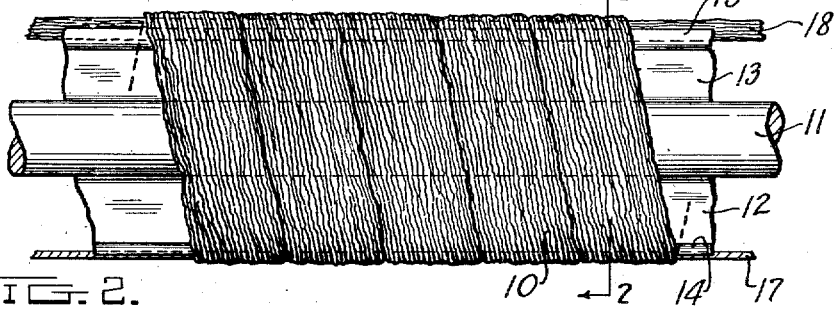
Figure 1 is a side elevation partly in section of a mandrel showing the manner in which the steel wool ribbon is wound.
Figure 2:
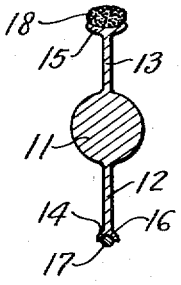
Figure 2 is a transverse sectional elevation on the line 2—2 of Figure 1.
Figure 3:
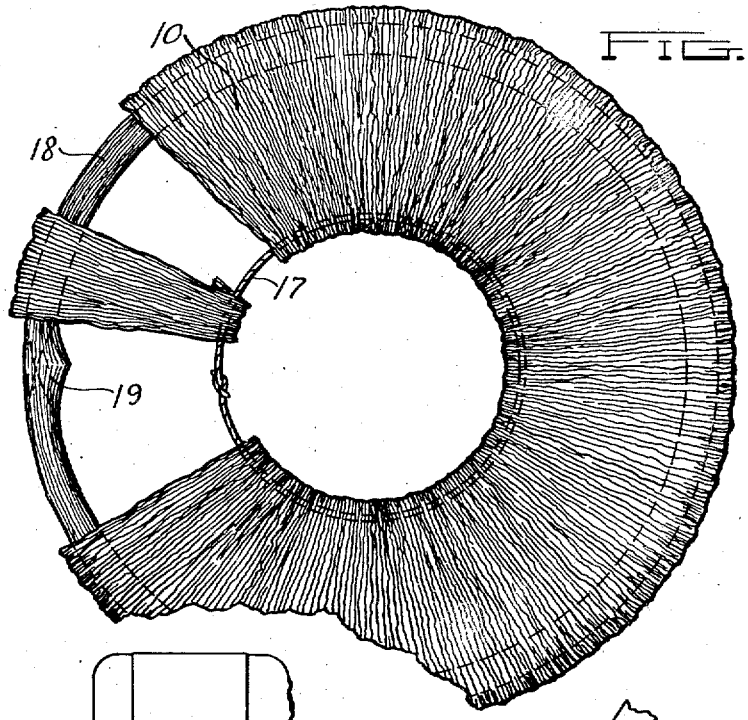
Figure 3 is a plan view of a portion of the steel wool annulus showing the manner in which the inner edge portion is secured and the outer portion reinforced.
Figure 4:
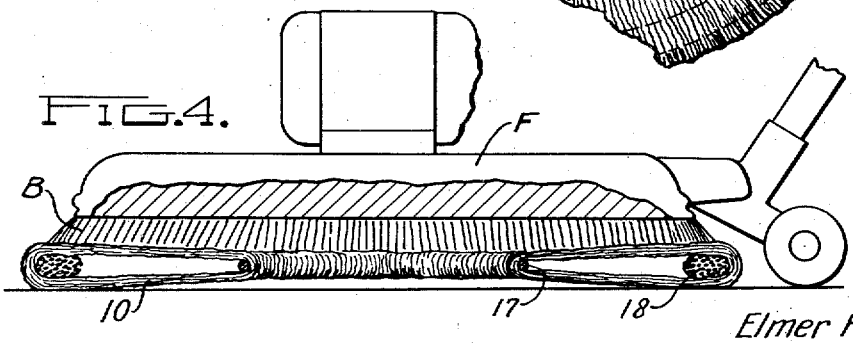
Figure 4 is a vertical sectional view of a steel wool annulus showing it disposed beneath the rotating brush of a floor surfacing machine.

Referring to the drawing, a single length of steel wool ribbon 10 is wound in overlapping relation helically upon a longitudinally extending mandrel consisting of a bar 11, which has diametrically opposed web portions 12 and 13, on the ends of which are flanges 14 and 15, respectively. The flange 14 is considerably smaller than the flange 15, and is provided with a groove 16 to receive a tying cord 17.

The flange 15 is a relatively wide and shallow, and is co-extensive with the flange 16. Disposed upon the flange 15 is a relatively large steel wool cord 18. The length of the tying cord 17 and reinforcing steel wool cord 18, will depend upon the desired size of the steel wool pad, and, after sufficient length of steel wool ribbon 10 has been wound about the mandrel and the cords 17 and 18, the cords having been anchored at their opposite ends in any suitable manner, the steel wool cord and the tying cord are stripped from the mandrel. Thereupon the body is shaped into the form of an annulus, preferably by drawing the tying cord 17 about a hub or sleeve of the proper diameter and tying the ends of the cord.

The free ends of the reinforcing steel wool cord 18 are then drawn together, overlapped, and twisted, as indicated at 19. Thereupon, the steel wool ribbon is placed evenly over the ends of the tying cord and reinforcing cord so that in its finished form, the body presents substantially an unbroken annulus.

The steel wool ribbon 10 may be of any desired grade, depending upon the use to which the pad is to be put, and the width of the ribbon may be varied as desired. The pad in use is placed between the rotating brush B of a floor surfacing machine F and the surface to be worked upon, the brush contacting and resting upon the top surface of the steel wool pad, and as the brush B rotates, the pad will also rotate.

It will be seen that the pad is substantially flat and that the looped ends of the ribbon are disposed on the outer peripheral edge and the inner edge, the reinforcing cord 18 being disposed between the layers and serving not only to reinforce the pad in the region of its peripheral edge, but also to thicken it at that place so that the outer portion of the pad, which moves at greater linear speed, will perform a more satisfactory abrading operation.

Inasmuch as pads of this character work best when used with rotating brushes, and since the latter wear first on the outer portion, without increasing the thickness of the pad in the region of its outer edge, the steel wool pad would not perform the work so efficiently. The steel wool cord 18, therefore, not only affords a reinforcement for the outer edge portion of the pad, keeping the steel wool strands in their proper position, but also brings into contact with the floor surface that area which accomplishes most of the work.

A pad of this character is particularly useful in the re-surfacing of floors, or similar surfaces, as well as cleaning and scouring them. After one side of the pad has been worn, it may be turned over so that the other side can be used. It is much more convenient to handle than bulk steel wool, and is available instantly for use.

It is to be understood that numerous changes in details of construction, arrangement, and choice of materials, may be effected without departing from the spirit of the invention, especially as defined in the appended claims.

What I claim as new and desire to secure by Letters Patent is:

1. A steel wool pad for floor surfacing machines comprising an annulus composed of layers of steel wool ribbon with strands thereof disposed radially and having loop portions at the peripheral edge and at the inner edge, tie means extending through the loop portions at the inner edge, and means carried by the annulus and extending within the loop portions at the peripheral edge for increasing the thickness of the peripheral edge portion thereof as compared to the inner edge portion.

2. A steel wool pad comprising an annulus composed of layers of steel wool ribbon with the strands thereof disposed radially and having loop portions at the peripheral edge and at the inner edge, tie means extending through the loop portions at the inner edge, and a steel wool member disposed within the loop portions at the outer edge portion for increasing the thickness of the pad in that region.

3. A steel wool pad comprising an annulus composed of layers of steel wool ribbon with the strands thereof disposed radially and having loop portions at the peripheral edge and at the inner edge, a tie member extending within the loop portions at the inner edge of the annulus, and steel wool means at the outer edge portion for holding the loops and strands in place.

4. A steel wool pad comprising an annulus composed of layers of steel wool ribbon with the strands thereof disposed radially and having loop portions at the peripheral edge and at the inner edge, a tie member extending within the loop portions at the inner edge of the annulus, and means at the outer edge portion for holding the loops and strands in place and for increasing the thickness of the pad in the peripheral region thereof.

5. A steel wool pad comprising an annulus composed of layers of steel wool ribbon with the strands thereof disposed radially and having loop portions at the peripheral edge and at the inner edge, a tying cord extending through the loop portions at the inner edge, and a steel wool cord disposed within the loop portions at the peripheral edge portion, said steel wool cord being of greater cross sectional area than that of said tying cord thereby to increase the thickness of the pad in the region of the peripheral edge portion.

6. A steel wool pad comprising an annulus composed of steel wool strands extending from the inner edge portion to the peripheral edge portion thereof and having loop portions at the peripheral edge and inner edge, tie means extending through the loop portions at the inner edge, and means carried by the annulus and extending within the loop portions at the peripheral edge for increasing the thickness of the peripheral edge portion thereof as compared to the inner edge portion.

7. A steel wool pad comprising an annulus composed of steel wool strands extending from the inner edge portion to the peripheral edge portion thereof and having loop portions at the peripheral edge and inner edge, a tying cord extending through the loop portions at the inner edge having the ends thereof secured together, and a steel wool cord disposed within the loop portions at the peripheral edge portion, said steel wool cord being of greater cross sectional area than that of said tying cord thereby to increase the thickness of the pad in the region of the peripheral edge portion.

ELMER R. MARTIN.